United States Patent Office 3,825,646
Patented July 23, 1974

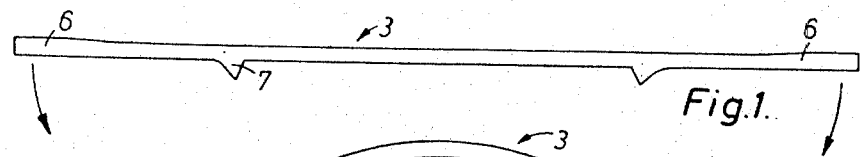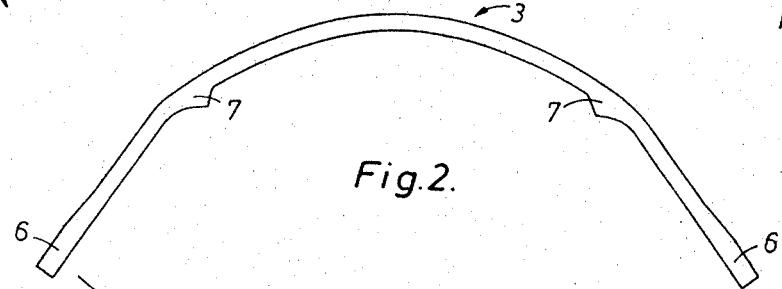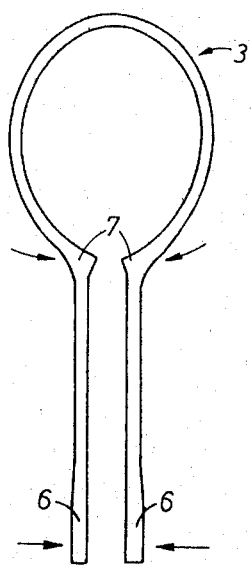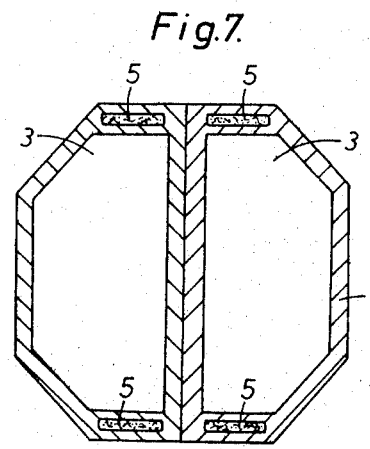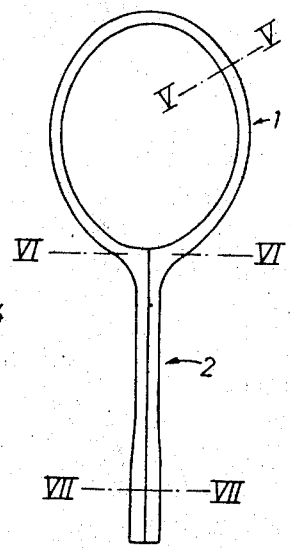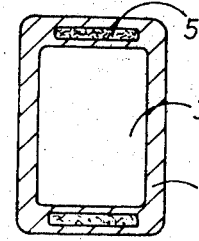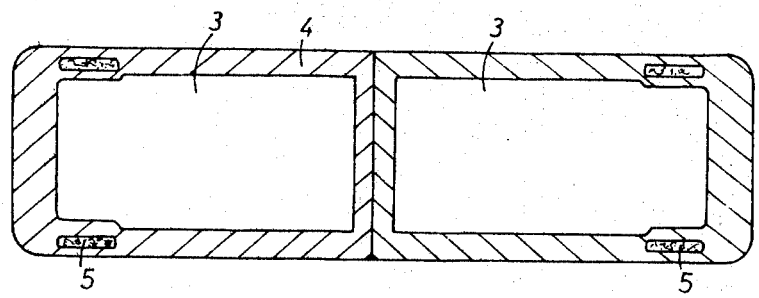

3,825,646
PROCESS FOR THE MANUFACTURING OF RACKETS FOR TENNIS AND OTHER SIMILAR GAMES
Roger Edmond Delmotte, Mourcourt, Belgium, assignor to Societe Anonyme les Usines de Callenelle en Abrege Saluc, Callenelle, Belgium
Filed Apr. 14, 1972, Ser. No. 244,043
Int. Cl. B29c 1/08; B29d 9/00
U.S. Cl. 264—257                    2 Claims

ABSTRACT OF THE DISCLOSURE

On a core which is stretched in a straight line and has a length corresponding to the periphery of a racket, including the parts of the handle, reinforcing tapes are wound where necessary a fibre material parallel to the core. The core is bent so as to impart to it the form of a racket blank. The materials applied onto the core are impregnated with pre-polymerized synthetic material, either before or after the bending. The blank is placed in a mould so as to give the racket the final shape and to bring about the final polymerization of the pre-polymerized material.

---

Figure 8:
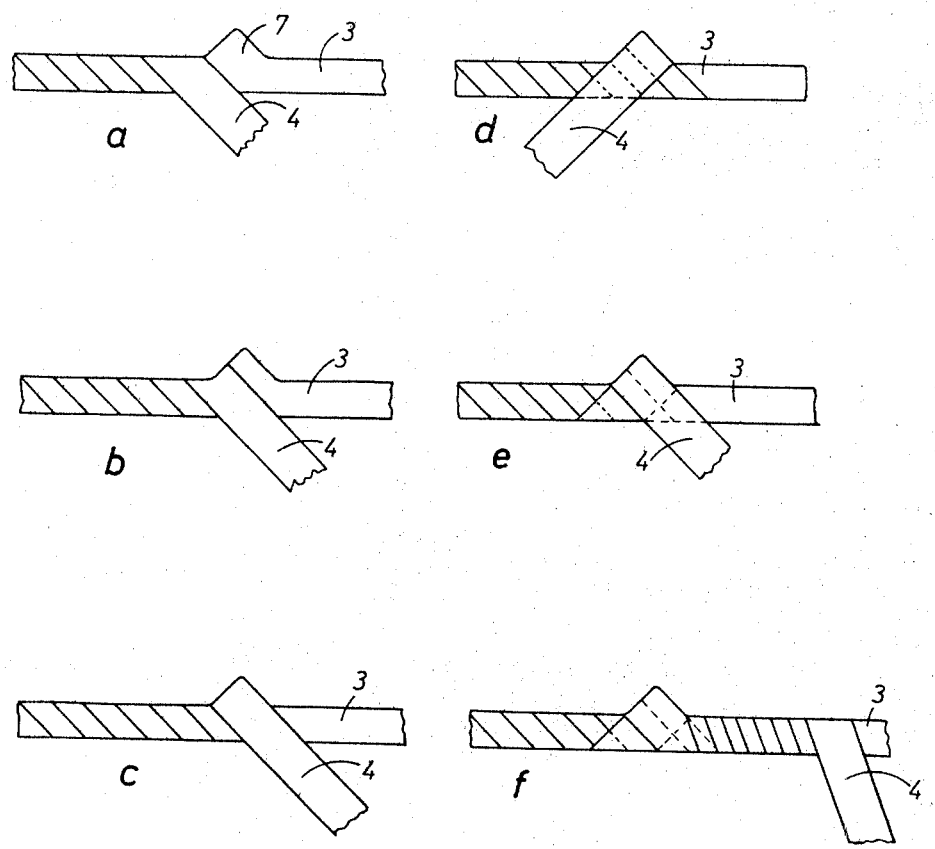

The present invention relates to a process for the manufacture of rackets for tennis or other similar games such as, for example, badminton.

These rackets comprise an oval frame to which a handle is fixed. They are usually made of wood by work which is essentially manual. It has already been proposed that at least a part of the wood be replaced by synthetic materials reinforced with materials or fibres such as glass or nylon fibres. Also there has been considered the preparing of a core for a racket of wood of any low quality, surrounding this core with a cord of glass fibres, glass and nylon fibres or nylon fibres, according to the elasticity which the racket must display at various points, placing the blank so obtained in a mould containing a thermohardening resin and carrying out the polymerization of this resin after it has spread into the fibrous material.

In other known processes, it has been recommended that the wooden core be done away with and that rackets should be envisaged which consist of a synthetic material reinforced by a fibrous material, particularly of glass fibres. It has, for example, been proposed that glass fibre wicks be arranged longitudinally in a mould, the groove having the shape of a racket, soaking these wicks with a polyester resin and subjecting the latter to polymerization. The result, however, is heavy and badly balanced rackets. For this reason thought has been given to providing in the racket a light core, which may in particular consist of a flexible tube of synthetic material which starts and ends at the end of the handle and goes round the oval section, the handle also comprising a pair of tubes closed on the inside. These tubes are covered with fibrous material impregnated with polyester resin. When this blank is placed in a mould for the polymerization of the resin, there is introduced into the tubes either a gas under a pressure or a material which is capable of forming as a result of the effect of the heat a rigid foam so as to swell the tubes and deform and press the impregnated fibres against the walls of the mould. In principle, this process makes it possible to provide lighter and better balanced rackets, but it necessitates the introduction of a triangular part which is located at the bifurcation of the handle and has to complete the oval frame of the racket at the point where it joins the handle. Furthermore, the preparation of the blank is not easy and calls for a great deal of specialized labor, and can only with difficulty be replaced by a mechanized preparation of the blank, which is in any case also this case when using a prefabricated wooden core for the racket.

The process according to the present invention overcomes the drawbacks of the known processes for the manufacture of rackets of synthetic material and also presents the advantage of making possible a mechanized preparation of the blanks.

For this purpose, reinforcing strips are wound around a core which is extended in a straight line and possesses a length corresponding to the periphery of a racket, including the handle part, where necessary inserting a fibrous material parallel to the core. This core is then bent so as to impart to it the shape of a racket blank, the materials applied on to the core as impregnated with pre-polymerized synthetic material either before or after the bending of the core, and the blank is placed in a mould so as to impart to the racket its final form and to achieve the final polymerization of the pre-polymerized material.

Advantageously there can be used a core which has thicknesses, extra thicknesses and humps which after bending take part in the shape of the racket. The core may be made of a light cellular material which is capable of being bent without breaking.

As reinforcing tape wound on the core one uses flat textiles or widths of inorganic material or natural or synthetic organic material, and as fibre material inserted parallel to the core one makes use of widths of inorganic material or natural or synthetic material. As inorganic material one uses in both cases preferably woven or unwoven glass fibre.

The reinforcing tapes are wound on the core stretched out in a straight line on the basis of a program of winding pitch which imparts to the different parts of the bent blank a cross-section similar to the final section of the racket, bearing in mind the fibre material inserted where necessary at different points parallel to the core. In order to wind the reinforcing tapes on the core, it is possible to use processes known in the manufacture of cables, particularly imparting to the core a rotary movement around its axis, combined or not with a movement of displacement along the axis. In this way the core extended in a straight line permits of a mechanized manufacture of the blank on the basis of a program determined in advance and capable of taking place automatically.

The advantage of this process is that it allows giving to the racket, at each point, by moulding, the dimension necessary for imparting to it the desired resistance and elasticity without creating undesirable plies in the strengthening tapes, each place receiving according to the variable dimension of the support the quantity of strengthening tape exactly necessary for a correct moulding.

The attached drawings represent by way of example several forms of execution of the invention.

In the drawings:
FIG. 1 shows a racket core extended in a straight line;
FIG. 2 represents this core at the beginning of bending;
FIG. 3 shows the core at the moment when it is almost completely bent;
FIG. 4 illustrates when the parts of the handle are set side-by-side;
FIGS. 5 to 7 are sections on enlarged scale of a racket along lines V—V, VI—VI and VII—VII of FIG. 4; and
FIG. 8 shows different stages in a program of winding a reinforcing tape around the core.

A racket for tennis or other similar games comprises an oval frame 1 and a handle 2 which are integral with one another and comprise a common core 3 on which there is wound a reinforcing tape 4 in one or more layers and in which there is inserted where necessary a fibre material 5 located parallel to the core.

According to the invention, the winding of the reinforcing tape 4 and the fitting of the fibre material 5 are carried out on a core 3 which is extended in a straight line (FIG. 1) and which is subsequently bent (FIG. 2) so as to form the blank of a racket (FIG. 3).

The core 3 consists of a rigid and light cellular material, for example synthetic material foam.

The length of the core corresponds to the total development of the frame 1 and the two parts of the handle 2, namely for a tennis racket approximately 150 cms. Its thickness varies according to the place and is of the order of 3 to 5 mm. less than that of the finished racket. The core comprises extra thicknesses, particularly at the point on the grip 6 of the handle 2 and humps 7 which serve to complete the oval of the frame at the point where the handle starts. These extra thicknesses or humps may be applied to the core in any suitable manner but, when the core is moulded, it is a good plan to provide them in the mould.

The reinforcing tape 4 wound around the core may be of a natural or synthetic inorganic or organic material; when it is inorganic, it consists advantageously of glass fibres which may be either in the form of a flat width or in the form of a textile. It is possible to use, for example, a woven glass ribbon with a tight texture of 220 grams per square meter and a width of 5 centimeters.

The fibre material 5 which is located parallel to the core serves to reinforce certain parts of a racket and is for this purpose held longitudinally during its insertion either between the core and the reinforcing ribbon or preferably between several layers of the latter, on the side of the flat parts of the racket, as shown by FIGS. 5 to 7. This material, when it is inorganic, also preferably consists of a glass fibre wick.

The reinforcing tape wound around the core and the fibre material inserted parallel to the core are impregnated with a pre-polymerized material which is capable of forming with these after final polymerization a laminated article possessing the strength and elasticity required. It is possible to provide for a number of pre-polymerized materials which are compatible with one another and give laminated materials of different elasticities, for example as regards the laminated products with fibre arranged parallel to the core in relation to the laminated product containing the tape wound around the core. If one uses several pre-polymerized materials, the impregnation of the reinforcing tape and that of the fibres parallel to the core are carried out prior to their application to the core, while the impregnation by a single pre-polymerized material may be carried out at any time, either before the application of these materials or after same, and if desired only in the polymerization mould.

The application of a reinforcing tape on the core extended in a straight line makes it possible to wind the latter by a program of winding pitch designed in advance so as to obtain a blank which possesses in its different parts a cross-section similar to that of the finished racket. The modifications of the pitch of the winding permit of a distribution of the weight so as to balance the racket suitably and reinforce the parts subjected to heavy stress. Thus, the reinforcing tape is wound with a smaller pitch at the place of the grip 6 than in the middle of the handle 2 for reasons of balance. For reasons of solidity, it is a good plan to provide a smaller pitch in the part of the future oval frame near the hump 7, as shown in FIG. 8, on which the winding to the left of the hump corresponds to a pitch covering one half of the previous layer of tape 4, whereas on the right of the hump the winding is visibly tighter. This figure also shows a way of covering the hump 7 with reinforcing tape which necessitates a temporary reversal of the winding pitch (8d).

The program of winding pitch can only be provided for a core which is extended in a straight line, because only in this case it is possible to envisage the use of mechanized and automatic means of winding. In one of the possible forms of embodiment the core is turned around its axis and, according to the means of winding used, has imparted it at the same time a displacement in the axial direction. Obviously it is possible to envisage other means of winding in which reels of reinforcing tape turn around a fixed core.

The racket blank extended in a straight line is bent (FIGS. 1 to 3) so that the two humps 7 come into mutual contact and are pressed heavily against one another when the parts of the handle are brought into direct contact. The humps 7 serve to perfect the oval shape of the frame at the level of the beginning of the handle, and for this purpose undergo a deformation.

The blank thus prepared is placed in a mould which imparts the final shape to the racket and permits the final polymerization of the pre-polymerized material.

Naturally the invention is not limited to the forms of embodiment which have been described and shown by way of example, and by making modifications thereto one would not fall outside its scope.

I claim:

1. A process for manufacturing a racket for tennis or similar games, said process comprising:

winding a compound material around and on a rectilinear core, the useful length of which is substantially equal to the periphery of the racket and which is provided with humps at symmetrically spaced positions on the core and also with variations in thickness including sections of reduced thickness and of increased thickness, said compound material being constituted by fibre-glass sheets or reinforcing tape impregnated with pre-polymerized material, winding the compound material to provide a variable pitch selectively along the length of the core to control the balance of the racket, and reversing the direction of winding of the compound material over the humps;

forming, by bending, a racket with an oval frame having a connected handle at the juncture of which said humps abut;

inserting said racket in a recess in a mould;

heating said mould to cure the compound material so that the same is polymerized; and removing said cured racket from said mould.

2. A process as claimed in claim 1 wherein each hump has angularly related sides, comprising winding the compound material in one direction up one side of each hump, reversing the direction of winding to cover the other side thereof, and reversing the direction of winding again in order to resume the winding in said direction.

References Cited

UNITED STATES PATENTS

| | | | |
|---|---|---|---|
| 2,923,652 | 2/1960 | Oka | 273—73 R X |
| 2,993,526 | 7/1961 | Young | 425—Dig. 12 |
| 3,641,230 | 2/1972 | Jenks | 273—73 F |
| 2,682,111 | 6/1954 | Kish | 264—Dig. 44 |
| 3,546,221 | 12/1970 | Johnson | 264—313 X |

FOREIGN PATENTS

| | | | |
|---|---|---|---|
| 208,945 | 3/1956 | Australia | 273—73 C |
| 1,112,253 | 8/1961 | Germany | 264—317 |
| 327,796 | 4/1930 | Great Britain | 273—73 G |
| 450,521 | 4/1935 | Great Britain | 273—73 F |

OTHER REFERENCES

Anon., Matrix Alloy, Cerro De Pasco Copper Corp., N.Y. (1931), p. 1.

Modern Plastics Encyclopedia, vol. 42, 1A (1965), Breshin Pub. Co., N.Y., pp. 265–267, 269, 270, 297–299 relied on.

Websters new International Dictionary, Meriam. Webster, Meriam Co., Springfield, Mass. (1940), p. 795 relied on.

ROBERT F. WHITE, Primary Examiner

W. E. HOAG, Assistant Examiner

U.S. Cl. X.R.

264—263, 295, 317